(12) United States Patent
Jansen

(10) Patent No.: US 12,704,588 B2
(45) Date of Patent: Aug. 11, 2026

(54) TIME-BASED CORRECTION TECHNIQUE FOR MULTISTATIC RADAR SYSTEM

(71) Applicant: NXP B.V., Eindhoven (NL)

(72) Inventor: Feike Guus Jansen, Eindhoven (NL)

(73) Assignee: NXP B.V., Eindhoven (NL)

( * ) Notice: Subject to any disclaimer, the term of this patent is extended or adjusted under 35 U.S.C. 154(b) by 334 days.

(21) Appl. No.: 18/316,619

(22) Filed: May 12, 2023

(65) Prior Publication Data

US 2024/0377504 A1 Nov. 14, 2024

(51) Int. Cl.

*G01S 7/02* (2006.01)
*G01S 7/03* (2006.01)
*G01S 13/12* (2006.01)

(52) U.S. Cl.

CPC .............. *G01S 7/023* (2013.01); *G01S 7/032* (2013.01); *G01S 13/12* (2013.01)

(58) Field of Classification Search

CPC .......... G01S 7/023; G01S 7/032; G01S 13/12; G01S 13/003; G01S 13/343;

(Continued)

(56) References Cited

U.S. PATENT DOCUMENTS 11,269,049 B2 * 3/2022 Wu ....................... G01S 13/931
11,656,325 B2 * 5/2023 Arbabian ................ G01S 7/415 342/169

(Continued)

FOREIGN PATENT DOCUMENTS

| | | | |
|---|---|---|---|
| EP | 3712652 | A1 | 9/2020 |
| EP | 3851869 | B1 | 7/2021 |
| WO | 2019126386 | A1 | 6/2019 |

OTHER PUBLICATIONS

Gottinger et al., "Coherent Automotive Radar Networks: The Next Generation of Radar-Based Imaging and Mapping," IEEE Journal of Microwaves, Jan. 7, 2021, 15 pages.

(Continued)

*Primary Examiner* — Yonghong Li

(57) ABSTRACT

A system includes first and second radar transceivers, a processor, and a non-transitory computer-readable medium storing machine instructions. The machine instructions cause the processor to determine a first frequency offset $a_1$ and a first initial time offset $\tau_{initial;1}$ between a first clock signal for the first radar transceiver and a reference clock for the processor, and the processor determines a first clock drift for the first clock signal relative to the reference clock based on the frequency offset $a_1$ and the time offset $\tau_{initial;1}$. The processor determines a second frequency offset $a_2$ and a second initial time offset $\tau_{initial;2}$ between a second clock signal for the second radar transceiver and the reference clock, and a second clock drift for the second clock signal relative to the reference clock based on the frequency offset $a_2$ and the time offset $\tau_{initial;2}$. The processor then compensates for the first and second clock drift.

21 Claims, 7 Drawing Sheets

(58) Field of Classification Search
CPC .......... G01S 13/878; G01S 7/40; G01S 7/415; G01S 7/417; G01S 13/42; G01S 13/584; G01S 13/931; G04G 5/00
See application file for complete search history.

(56) References Cited

U.S. PATENT DOCUMENTS

| | | | | |
|---|---|---|---|---|
| 2009/0180466 | A1* | 7/2009 | Soul | H04B 7/10<br>375/267 |
| 2017/0276779 | A1* | 9/2017 | Seller | G01S 13/84 |
| 2020/0025899 | A1* | 1/2020 | Starzer | G01S 13/87 |
| 2020/0309939 | A1* | 10/2020 | Subburaj | G01S 13/584 |
| 2022/0349992 | A1* | 11/2022 | Tsutsumi | G01S 7/4069 |
| 2024/0219515 | A1 | 7/2024 | Wu et al. | |

OTHER PUBLICATIONS

Gottinger et al., “Coherent Full-Duplex Double-Sided Two-Way Ranging and Velocity Measurement Between Separate Incoherent Radio Units,” IEEE Transactions on Microwave Theory and Techniques, vol. 67, No. 5, May 2019, 17 pages.

* cited by examiner

TIME-BASED CORRECTION TECHNIQUE FOR MULTISTATIC RADAR SYSTEM

BACKGROUND

In distributed coherent radar systems, multiple radar systems derive their internal time base and oscillation frequency from a common clock source. In one approach, a low frequency clock signal is distributed from a particular radar system or central controller to the remaining radar systems. However, in a harsh automotive environment, the clock signal is contaminated, having an adverse effect on the radar sensing performance. Using a unique, local clock source for each radar system avoids contamination but cannot guarantee that the plurality of unique clock sources produce an equal frequency and phase, resulting in a difference in clock frequency and oscillation frequency between the multiple radar systems.

The frequency and phase differences, whether from contamination of a central clock signal or from variations between a plurality of local clock signals, result in a relative time drift between radar systems, such that the relative duration of a radar chirp frame differs from one radar system to another. Since radar systems measure the distance to an object in the environment using time of flight, the varying chirp frame lengths lead to dispersion of the time of flight estimates over time. The result is a decrease in sensor sensitivity and reduced maximum and minimum unambiguous distance.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

As discussed previously herein, the relative time drift between radar systems decreases sensor sensitivity and reduces the maximum and minimum unambiguous distances able to be determined by the radar systems. The disclosed techniques and radar systems determine a frequency offset and an initial time offset between a radar system clock and a reference clock and use the determined frequency offset and time offset to compensate for clock drift between any two radar systems in a distributed radar system during a radar chirp frame. The disclosed clock compensation technique allows the relative clock drift between any two radar systems to compensated for by applying a frequency compensation to transmitted or received radar signals, separating contributions from different radar systems. In addition, the oscillation frequency of each radar system's clock can be manipulated to compensate for clock drift. After clock drift compensation, the sensor sensitivity and maximum and minimum unambiguous distances able to be determined by the distributed radar sensing system are improved.

Figure 1:
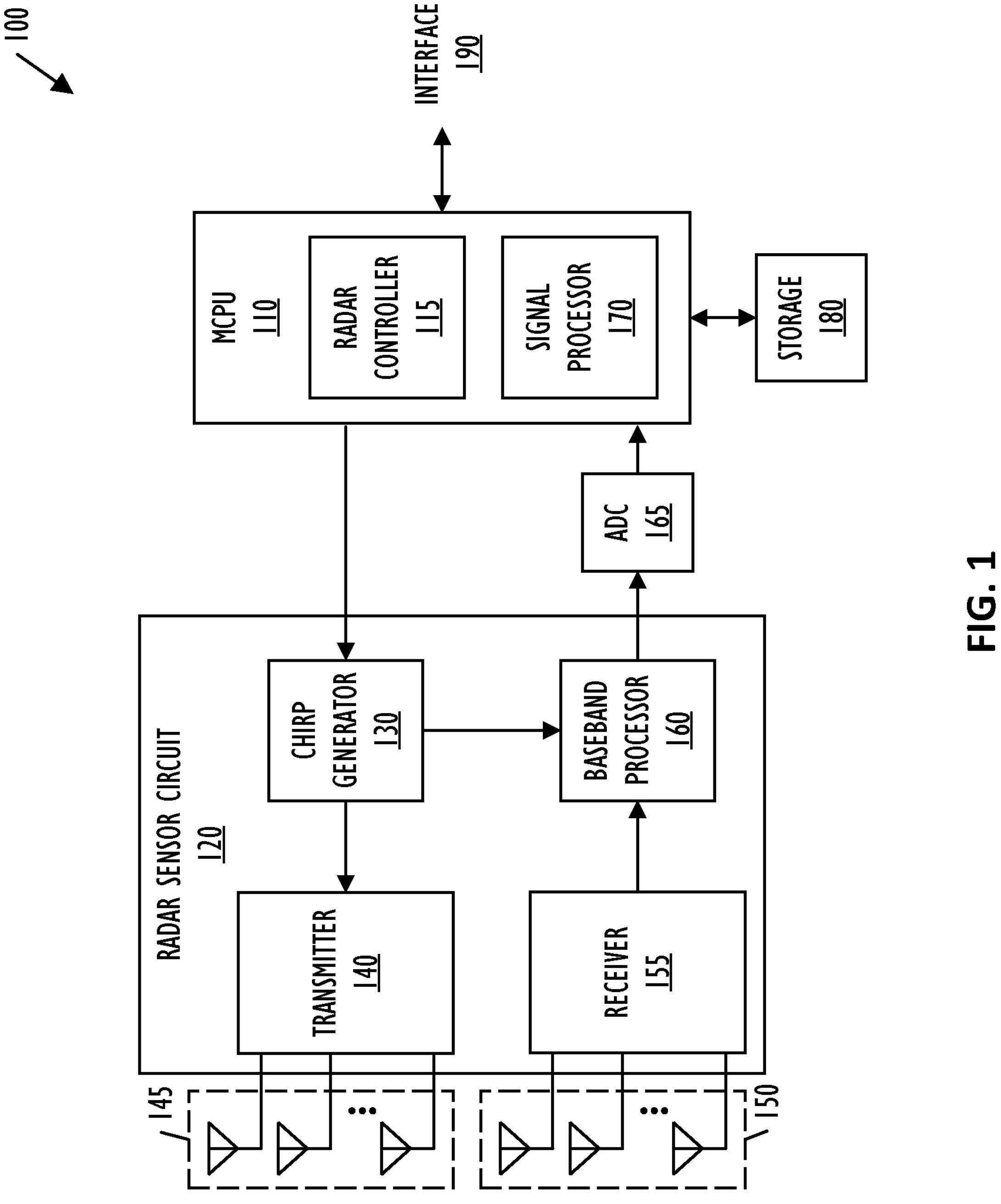
FIG. 1 shows, in block diagram form, an example radar system, according to one embodiment.

FIG. 1 shows, in block diagram form, an example radar system 100, according to an embodiment. Radar system 100 can be included in a vehicle, such as for an automotive driver assistance system. The example radar system 100 is a frequency-modulated continuous wave (FMCW) radar system, also referred to as a continuous-wave frequency-modulated (CWFM) radar, and capable of determining the distance or range, velocity, and angle of arrival of an object in the field of view of radar system 100. The term "angle of arrival" or "direction of arrival" of an object is used herein to indicate the angle of arrival of a signal reflected off the object relative to the alignment of the radar system.

In this example, radar system 100 includes a microcontroller and processor unit (MCPU) 110, a radar sensor circuit 120, a first antenna array 145, a second antenna array 150, an analog-to-digital converter (ADC) 165, and storage 180. The MCPU 110 comprises one or more MCPU cores, general purpose processing cores, array or vector processing cores, parallel processing cores, graphic processing units, neural net and linear algebra accelerators, field-programmable gate arrays, digital signal processors, application-specific integrated circuits, and the like, or any combination thereof. The term "MCPU" in the singular is used herein to refer to either a single or multiple of the MCPU cores, general purpose processing cores, array or vector processing cores, parallel processing cores, graphic processing units, digital signal processors, neural net and linear algebra accelerators, application-specific integrated circuits, field-programmable gate arrays, and the like, or any combination thereof comprised in the MCPU 110.

MCPU 110 includes a radar controller 115 and a signal processor 170. The radar controller 115 can control radar parameters of the radar sensor circuit 120 such as frequency band, length of a radar frame, and the like via the chirp generator 130 in the radar sensor circuit 120. A control signal from the MCPU 110 can be used to adjust the radar chirp signals output from a chirp generator 130 included in radar sensor circuit 120. The signal processor 170 in MCPU 110 can also receive the data from the radar sensor circuit 120 and perform signal processing for determining a distance or range between a target object and radar system 100, a radial velocity of the target object, an angle of arrival for the target object, and the like. The signal processor 170 can provide the calculated values to the storage 180 and/or to other systems via the interface 190.

The interface 190 can enable the MCPU 110 to communicate with other systems over local and wide area networks, the internet, automotive communication buses, and/or other kinds of wired or wireless communication systems, for example. The MCPU 110 can provide the calculated values over the interface 190 to other systems, such as a radarcamera-lidar fusion system; an automated driving assistance system including parking, braking, or lane-change assistance features; and the like. The storage 180 can be used to store instructions for the MCPU 110, received data from the radar sensor circuit 120, calculated values from the signal processor 170, and the like. Storage 180 can be any appropriate storage medium, such as a volatile or non-volatile memory.

The radar sensor circuit 120 includes the chirp generator 130, a transmitter 140, a receiver 155, and a baseband processor 160. The chirp generator 130 can include a local oscillator, for example, and generates radar chirp signals and provides them to the transmitter 140. For example, the chirp generator 130 can frequency modulate a continuous wave signal to form a series of linear chirp signals based on a control signal from the radar controller 115. The transmitted chirp signal of a known, stable frequency continuous wave varies up and down in frequency over a fixed period of time by the modulated signal. The transmitter 140 drives the first antenna array 145 of one or more transmitter (TX) antennas. The second antenna array 150 comprises one or more receiver (RX) antennas and receives signals reflected from objects in the path of the transmitted chirp signals from the TX antenna array 145. The TX antenna array 145 and the RX antenna array 150 can be stationary or configured to transmit and receive across a range of area, such as by mechanical movement.

The receiver 155 receives the reflected signals from the RX antenna array 150 and provides them to the baseband processor 160. The baseband processor 160 also receives the transmitted chirp signals from the chirp generator 130 and down-converts the received chirp signals directly into the baseband using the copy of the transmitted chirp signals from the chirp generator 130. The baseband processor 160 can then filter and amplify the baseband signal. The baseband processor 160 provides the filtered and amplified baseband signal to the ADC 165, which digitizes the signal and provides it to the MCPU 110. The signal processor 170 in the MCPU 110 can then perform time domain to frequency domain transforms such as fast Fourier transforms (FFTs) and other signal processing to reduce radar interference, perform windowing, and compress the radar data.

Frequency differences between the received reflections and the transmitted chirp signal increase with delay and so are proportional to distance. The phase differences between the received reflections across consecutive chirps in a radar frame are indicative of the velocity of objects in the field of view. For implementations in which RX antenna array 150 includes two or more receiver antennas, the phase difference between received reflections at a first RX antenna and received reflections at a second RX antenna can be used to determine the angle of arrival of target objects. For example, the down-converted and digitized receive signal corresponding to each chirp is first transformed using an FFT (called the range FFT). The range FFT produces a series of range bins with the value of each range bin denoting the signal strength of reflected targets at the corresponding range. A further "Doppler" FFT is then performed for each range bin across all the chirps in a frame to estimate the velocities of reflected targets. Additional processing can then be performed to determine the angle of arrival between the targets and the radar system 100. Although the radar system 100 is described herein as implementing FFT-based range-Doppler processing, any appropriate transforms may be used to produce the range-Doppler information.

Figure 2:
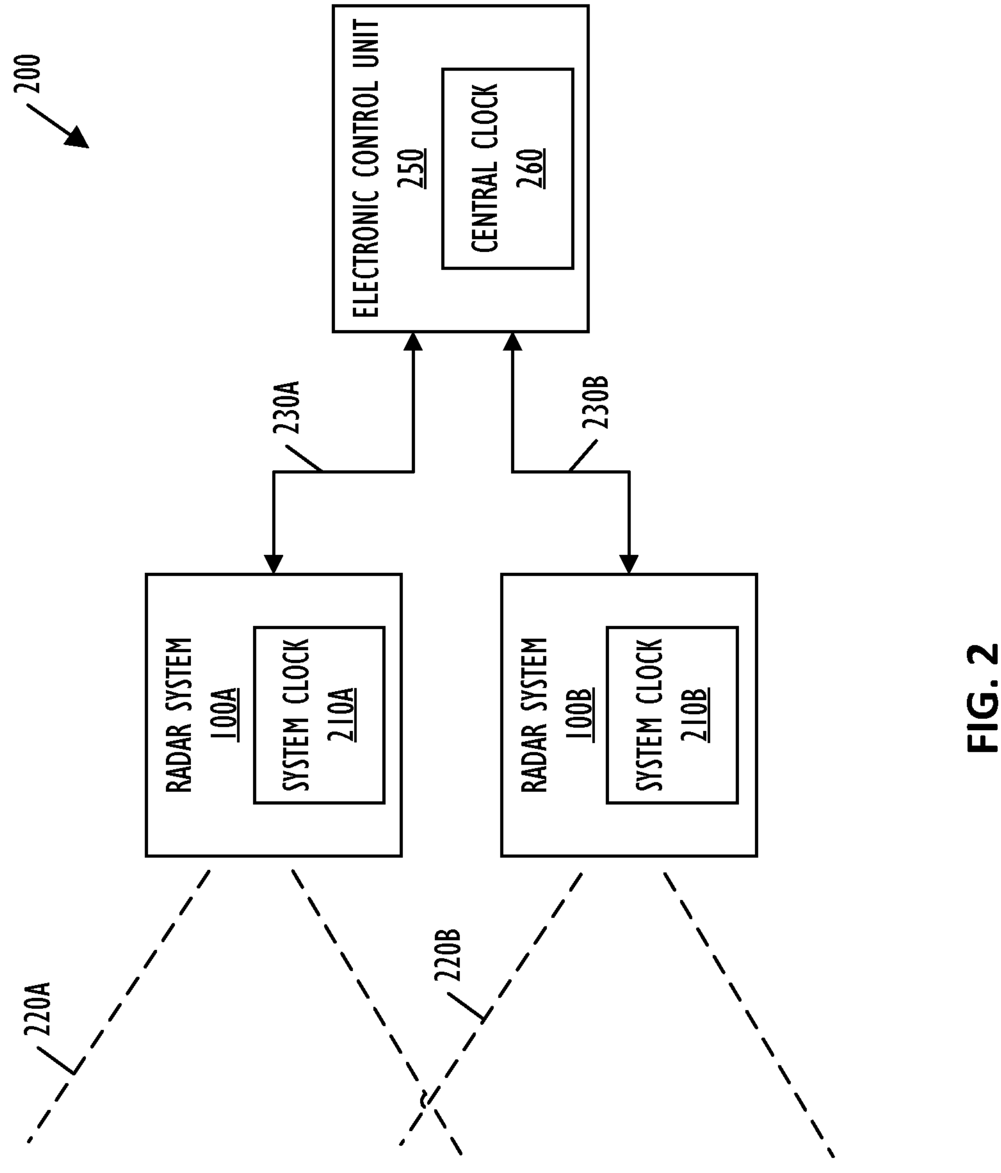
FIG. 2 shows, in block diagram form, an example distributed radar system, according to one embodiment.

The radar system 100 can be one of a plurality of radar systems incorporated in a larger sensor system, such as in an automotive radar system. For example, FIG. 2 shows an example distributed radar system 200, according to one embodiment. The example distributed radar system 200 includes two radar systems 100A and 100B and an electronic control unit 250. The radar system 100A operates based on a local system clock 210A and has a field of view 220A, and the radar system 100B operates based on a local system clock 210B and has a field of view 220B. The fields of view 220A and 220B overlap. Although in the example distributed radar system 200, two radar systems 100A and 100B are shown, any number of radar systems having at least partially overlapping fields of view can be used.

The radar systems 100A and 100B share raw radar data, analog-to-digital converter data samples, or transformed samples over an interface 230 to a shared processor included in the electronic control unit 250. The electronic control unit 250 performs additional signal processing such as determining the distance, velocity, and angle of arrival between objects in the environment and the radar systems 100A and 100B to generate a representation of the environment based on the received radar data from radar systems 100A and 100B. In some implementations, the electronic control unit 250 uses a central clock 260 to provide a common time base such as generic precision time protocol (gPTP) to the radar systems 100A and 100B. The common time base is shared over the interface 230 using a timing protocol in which the radar systems 100A and 100B and electronic control unit 250 exchange time stamps taken on incoming and outgoing data packets. The electronic control unit 250 then determines the relative time offset and difference in clock frequency between the central clock 260 and the system clocks 210A and 210B, respectively. The radar systems 100A and 100B time stamp incoming and outgoing packets using the system clocks 210A and 210B, respectively, that are used to derive the local time base for radar sensing. Similarly, the electronic control unit 250 uses a single or multiple synchronized counters to derive the time stamps on incoming and outgoing packets directed to each of the radar systems 100A and 100B.

In some implementations, the radar systems 100A and 100B transmit and receive radar signals simultaneously, for example to estimate the tangential velocity of objects in the environment. To distinguish between the sources of the received radar signals, any appropriate multiplexing technique can be used, such as time division multiplexing, Doppler division multiplexing, frequency division multiple access (FDMA) coding, and the like. In FDMA coding, each of radar systems 100A and 100B transmits radar signals with a unique frequency offset. For quadrature receivers, the frequency offset is equal to an integer multiple of the receiver intermediate frequency (IF) bandwidth divided by the number of radar sensors. For real or in-phase receivers, the frequency offset is equal to two times the integer multiple of the receiver IF bandwidth divided by the number of radar sensors. The ADC samples of the received radar signals are converted to the frequency domain and the origin of the frequency domain data samples can be determined based on the corresponding index.

Figure 3:
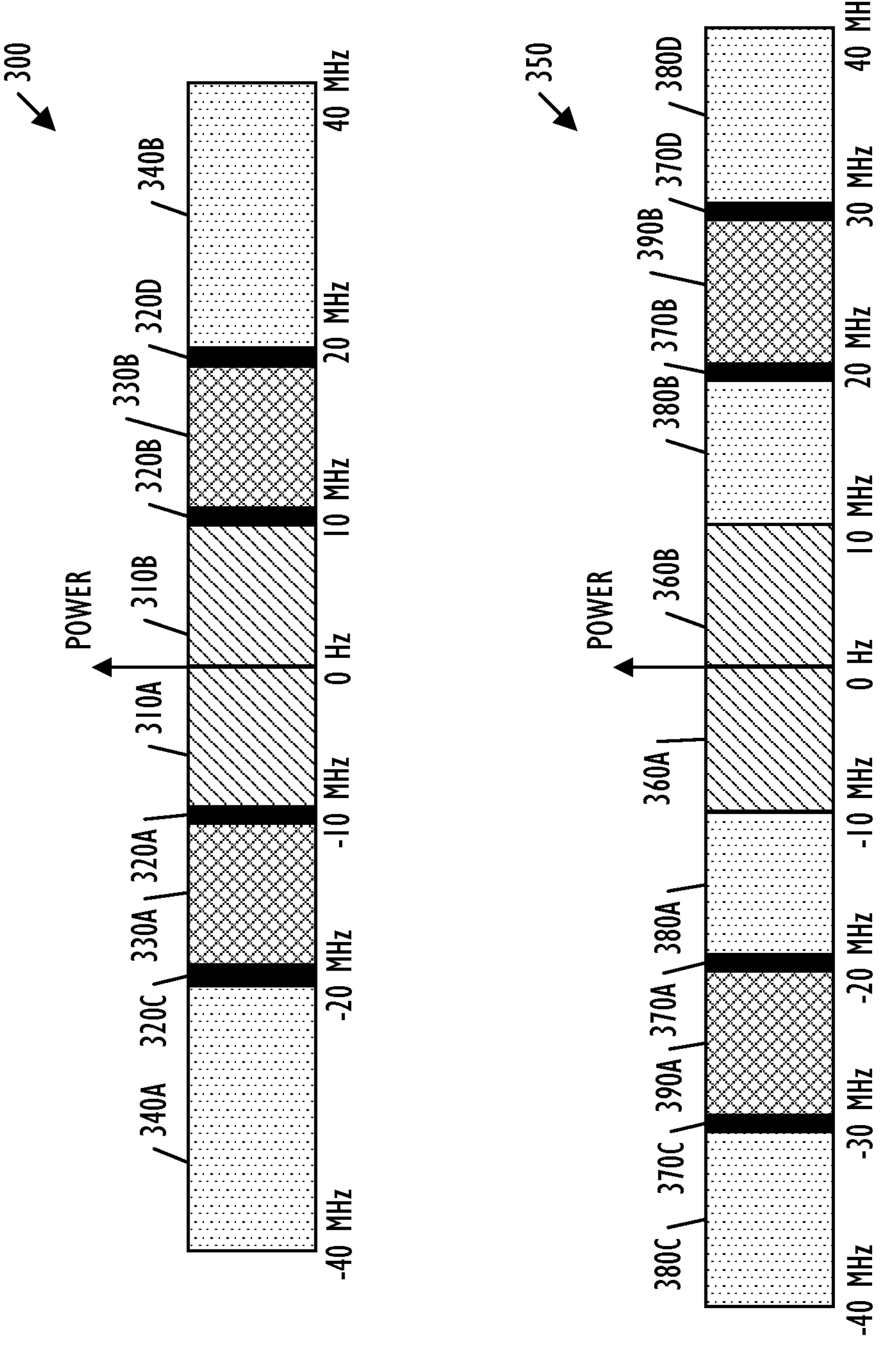
FIG. 3 shows a diagram illustrating the assignment of frequency domain samples according to their beat frequency in a bi-static frequency division multiple access radar system, according to one embodiment.

To illustrate, the diagrams 300 and 350 shown in FIG. 3 illustrate the assignment of frequency domain samples according to their beat frequency in a bi-static FDMA radar system, according to one embodiment. Diagram 300 is a graph of the possible frequencies of the received signal in the IF band, centered around direct current (DC) or 0 Hertz (Hz) for an example assignment of frequency domain samples. The frequency bands indicated by sections 310A and 310B around DC represent the monostatic spectrum;

that is, the received radar reflections within the frequency bands indicated by sections 310A and 310B are reflections of radar signals transmitted by the same radar system that receives them and operates at the nominal carrier frequency. Within the monostatic frequency bands 310A and 310B, an increase in the difference to 0 Hz corresponds to an increasing distance from the radar system. For example, a received radar signal 100 Hertz (Hz) offset from DC corresponds to an object in the environment a shorter distance away from the radar system than a received radar signal one MegaHertz (MHz) offset from DC. Conversely, a received radar signal one MHz offset from DC corresponds to an object in the environment a longer distance away from the radar system than a received radar signal 100 Hz offset from DC.

The sections 320A and 320B represent margins between the monostatic spectrum indicated by sections 310A and 310B and the bistatic spectrum indicated by sections 330A and 330B. The margin sections 320A and 320B can be any appropriate margin between the monostatic spectrum and the bistatic spectrum, such as 10% of the monostatic frequency spectrum. Received radar reflections within the bistatic spectrum represented by the sections 330A and 330B are reflections of radar signals transmitted by a different radar system than the one that receives them. Within the bistatic frequency bands 330A and 330B, an increase in the difference to the carrier frequency DC corresponds to a decreasing distance from the radar system. For example, a received radar signal 14 MHz offset from DC corresponds to an object in the environment a farther distance away from the radar system than a received radar signal 18 MHz offset from DC. Conversely, a received radar signal 18 MHz offset from DC corresponds to an object in the environment a shorter distance away from the radar system than a received radar signal 14 MHz offset from DC. The margin sections 320C and 320D separate the bistatic spectrum in sections 330A and 330B from the discarded sections 340A and 340B.

Diagram 350 is a graph of the possible frequencies of the received signal in the IF band, centered around DC or 0 Hz for another example assignment of frequency domain samples. The frequency bands indicated by sections 360A and 360B around DC represent the monostatic spectrum and reflections of radar signals transmitted by the same radar system that receives them and operates at the nominal carrier frequency plus a carrier frequency offset, such as 20 MHz. Within the monostatic frequency bands 360A and 360B, an increase in the difference to DC corresponds to an increasing distance from the radar system.

The sections 370A and 370B represent margins between the monostatic spectrum indicated by sections 360A and 360B and the discarded portions indicated by sections 380A and 380B. The discarded sections 380A and 380B between the monostatic sections 360A and 360B and the bistatic spectrum sections 390A and 390B are a consequence of the FDMA implementation in an FMCW radar system. Within the bistatic frequency bands 390A and 390B, an increase in the difference to DC corresponds to a decreasing distance from the radar system. The margins 370C and 370D separate the bistatic frequency spectrum in section 390A and 390B from the discarded sections 380C and 380D.

Figure 4:
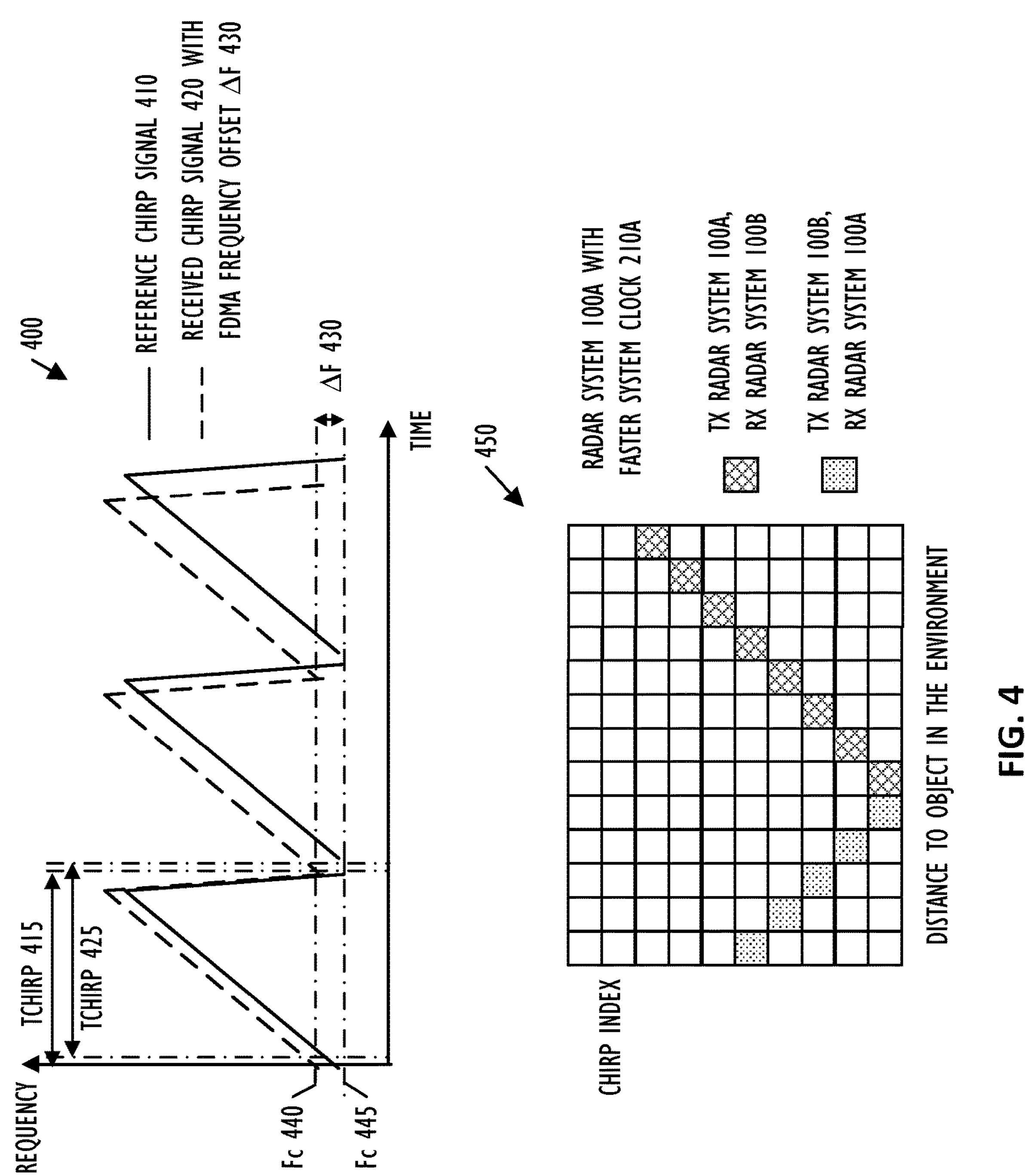
FIG. 4 shows diagrams illustrating the effect of a difference in time base between a transmitting radar system with a faster system clock and a receiving radar system with a slower system clock, according to one embodiment.

FIG. 4 shows diagrams 400 and 450 illustrating the effect of a difference in time base between a transmitting radar system with a faster system clock and a receiving radar system with a slower system clock, according to one embodiment. For ease of illustration, the diagrams 400 and 450 are described herein with respect to the distributed radar system 200 shown in FIG. 2. In diagram 400, a reference chirp signal 410 generated by the receiving radar system 100B has a period Tchirp 415 and a carrier frequency Fc 440, and a received chirp signal 420 received by the receiving radar system 100B has a period Tchirp 425 and a carrier frequency Fc 445. The received chirp signal 420 is a reflection of a chirp signal transmitted by radar system 100A with an FDMA frequency offset ΔF 430 compared to the receiving radar system 100B and is delayed relative to the reference chirp signal 410 because of the time of flight.

In addition, the system clock 210A for the transmitting radar system 100A oscillates with a higher frequency than the system clock 210B for the receiving radar system 100B; that is, the system clock 210A for the transmitting radar system 100A is faster than the system clock 210B for the receiving radar system 100B. As a result, the relative delay between the reference chirp signal 410 and the received chirp signal 420 increases over time, and the beat signal maps to negative frequencies because the instantaneous frequency of the received signal is greater than the frequency of the reference signal. As illustrated in diagram 450, the receiving radar system 100B interprets the increasing signal delay as the object in the environment moving nearer to the radar system 100B, even if the object is actually stationary relative to radar system 100B. Conversely for chirp signals transmitted by the radar system 100B and received by the radar system 100A, the increasing signal delay between the locally generated reference chirp signal and the received chirp signal maps to positive beat frequencies because the instantaneous frequency of the received signal is less than the frequency of the reference signal, and the radar system 100A interprets the increasing signal delay as the object in the environment moving away from the radar system 100A. The difference in system clocks 210A and 210B leads to a shift in the carrier frequencies for the radar systems 100A and 100B, which are derived directly from the systems clocks 210A and 210B. The difference in carrier frequencies can be corrected based on the estimated clock offsets.

Figure 5:
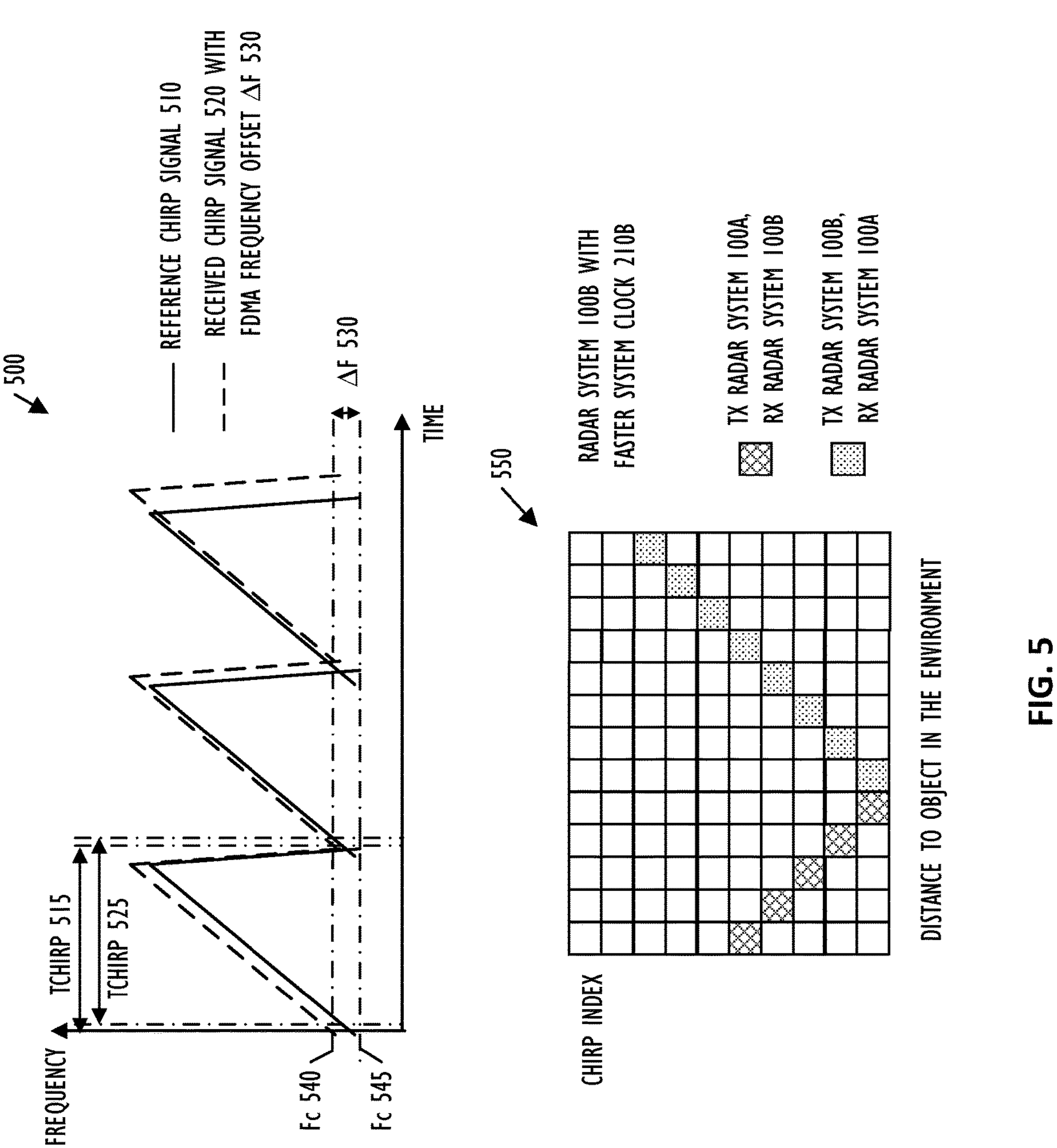
FIG. 5 shows diagrams illustrating the effect of a difference in time base between a transmitting radar system with a slower system clock and a receiving radar system with a faster system clock, according to one embodiment.

FIG. 5 shows diagrams 500 and 550 illustrating the effect of a difference in time base between a transmitting radar system with a slower system clock and a receiving radar system with a faster system clock, according to one embodiment. For ease of illustration, the diagrams 500 and 550 are described herein with respect to the distributed radar system 200 shown in FIG. 2. In diagram 500, a reference chirp signal 510 generated by the receiving radar system 100B has a period Tchirp 515 and a carrier frequency Fc 540, and a received chirp signal 520 received by the receiving radar system 100B has a period Tchirp 525 and a carrier frequency Fc 545. The received chirp signal 520 is a reflection of a chirp signal transmitted by radar system 100A with an FDMA frequency offset ΔF 530 compared to the receiving radar system 100B and is delayed relative to the reference chirp signal 510 because of the time of flight.

In addition, the system clock 210A for the transmitting radar system 100A oscillates with a lower frequency than the system clock 210B for the receiving radar system 100B; that is, the system clock 210A for the transmitting radar system 100A is slower than the system clock 210B for the receiving radar system 100B. As a result, the relative delay between the reference chirp signal 510 and the received chirp signal 520 decreases over time, and the beat signal maps to negative frequencies because the instantaneous frequency of the received signal is greater than the frequency of the reference signal. As illustrated in diagram 550, the receiving radar system 100B interprets the decreasing signal delay as the object in the environment moving farther from the radar system 100B, even if the object is actually stationary relative to radar system 100B. Conversely for chirp signals transmitted by the radar system 100B and received by the radar system 100A, the decreasing signal delay between the locally generated reference chirp signal and the received chirp signal maps to positive beat frequencies because the instantaneous frequency of the received signal is less than the frequency of the reference signal, and the radar system 100A interprets the decreasing signal delay as the object in the environment moving closer to the radar system 100A. The difference in system clocks 210A and 210B leads to a shift in the carrier frequencies for the radar systems 100A and 100B, which are derived directly from the systems clocks 210A and 210B. The difference in carrier frequencies can be corrected based on the estimated clock offsets.

The time drift between a particular radar system n and a reference time source, such as the central clock 260 of the electronic control unit 250, can be represented as:

$$\tau_{drift,n} = t \times \alpha_n$$

where $\tau_{drift,n}$ represents the time drift between the particular radar system n and the reference time source, t represents time, and $\alpha_n$ represents the clock offset of the particular radar system n with respect to the reference clock. The clock offset $\alpha_n$ can be estimated using the radar chirp signals, timestamp information from messages sent over the interfaces 230, and the like.

Figure 6:
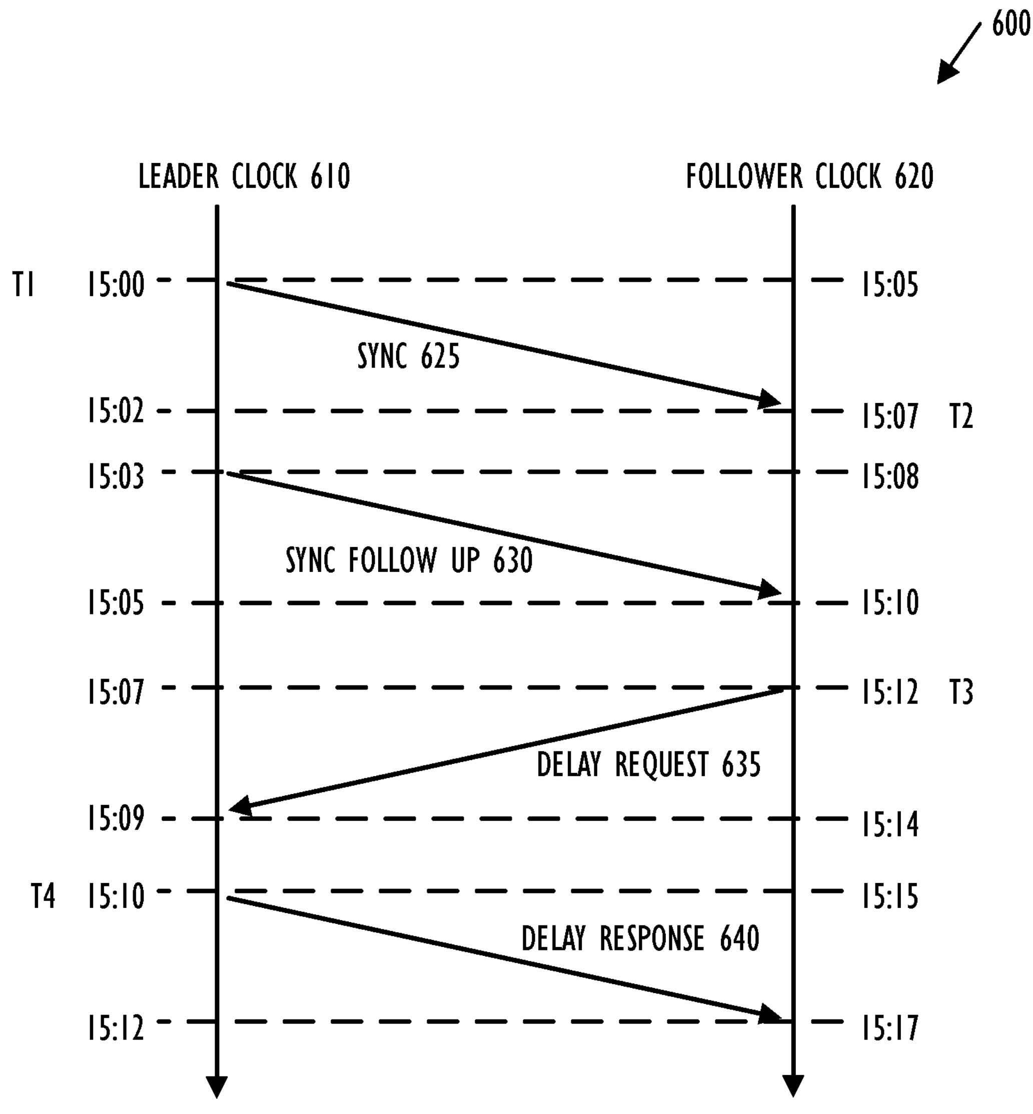
FIG. 6 shows a timing diagram for illustrating the time difference between a leader clock and a follower clock, according to one embodiment.

For example, FIG. 6 shows a timing diagram 600 that illustrates the time difference between a leader clock 610 and a follower clock 620, according to one embodiment. For ease of illustration, the timing diagram 600 is described herein with respect to the distributed radar system 200 shown in FIG. 2. At time T1, 15:00 according to the leader clock 610 and 15:05 according to the follower clock 620, the electronic control unit 250 sends a sync signal 625 to a radar system 100 having the follower clock 620. The radar system 100 receives the sync signal 625 at time T2, 15:02 according to the leader clock 610 and 15:07 according to the follower clock 620. The electronic control unit 250 sends a sync follow up signal 630 to the radar system 100 at 15:03 according to the leader clock 610 and 15:08 according to the follower clock 620. The radar system 100 receives the sync follow up signal 630 at 15:05 according to the leader clock 610 and 15:10 according to the follower clock 620.

At time T3, 15:07 according to the leader clock 610 and 15:12 according to the follower clock 620, the radar system 100 sends a delay request 635 to the electronic control unit 250. The electronic control unit 250 receives the delay request 635 at 15:09 according to the leader clock 610 and 15:14 according to the follower clock 620. At time T4, 15:10 according to the leader clock 610 and 15:15 according to the follower clock 620, the electronic control unit 250 sends a delay response signal 640 to the radar system 100. The radar system 100 receives the delay response signal 640 at 15:12 according to the leader clock 610 and 15:17 according to the follower clock 620.

The electronic control unit 250 or the radar system 100 can use the time stamps on the incoming and outgoing signal packets to determine the offset and delay between the central clock 260 (the leader clock 610) and the system clock 210 (the follower clock 620). The estimated clock offset of the follower clock 620 can be represented as:

$$\alpha_n = \frac{T1(y) - T1(y-1)}{T2(y) - T2(y-1)}$$

Where T1($y$) represents the T1 timestamp in the y'th execution of the timestamp exchange between the electronic control unit 250 and the radar system indicated by the index n, and T2($y$) represents the T2 timestamp in the y'th execution of the timestamp exchange between the electronic control unit 250 and the radar system indicated by the index n. Likewise $\alpha_m$ can be estimated between the electronic control unit 250 and radar system 100B using the T1($y$) timestamp in the y'th execution of the timestamp exchange between the electronic control unit 250 and the radar system indicated by the index m and the T2($y$) timestamp in the y'th execution of the timestamp exchange between the electronic control unit 250 and the radar system indicated by the index m. Various filters can be applied to increase the accuracy of the clock offset estimation. Additionally, in implementations in which multiple ethernet devices, switches, or other devices make up the connection between the electronic control unit 250 and a radar system 100, an accumulation of clock offsets between pairs of devices is made to represent the total offset between the electronic control unit 250 and the radar system 100. As a result, the clock offset of each radar system in a distributed radar system is known. The relative drift in time between any two radar systems n and m at a particular time t can be represented as:

$$\tau_{drift;n,m} = t((a_n - a_m))$$

Where $\alpha_n$ represents the clock offset between the electronic control unit 250 and an n'th radar system 100, $\alpha_m$ represents the clock offset between the electronic control unit 250 and an m'th radar system 100, and t represents time.

In addition to the relative drift of time between any two radar systems, an initial clock offset can occur due to implementation inaccuracies and finite accuracy in the time of day at each radar system. The initial clock offset can cause the radar systems to start transmitting and receiving a chirp frame at different times, leading to a constant offset between the two radar systems. With the initial clock offset and the relative drift of time, the instantaneous time offset between any two radar systems n and m at a particular time t can be represented as:

$$\tau_{offset;n,m} = \tau_{initial} + t((a_n - a_m))$$

The time offset between any two radar systems n and m at a particular time t can also be represented as a frequency offset of the beat signal:

$$f_{offset}(n, m, t) = (\tau_{offset;n,m})\left(\frac{\Delta F}{T_{acq}}\right)$$

where ΔF represents the chirp bandwidth and Tacq represents the period of the data acquisition time. The beat frequency offset is stable during a single chirp but varies across the chirps in a chirp frame. Hence, the frequency offset used to align the distance spectra from the individual chirps for any two radar systems n and m can be represented as:

$$f_{correction}(n, m, q) = [\tau_{initial} + q * T_{chirp} * (a_n - a_m)] * \frac{\Delta F}{T_{acq}}$$

where q represents the chirp index within the chirp frame and Tchirp represents the period of the chirp signal.

Figure 7:
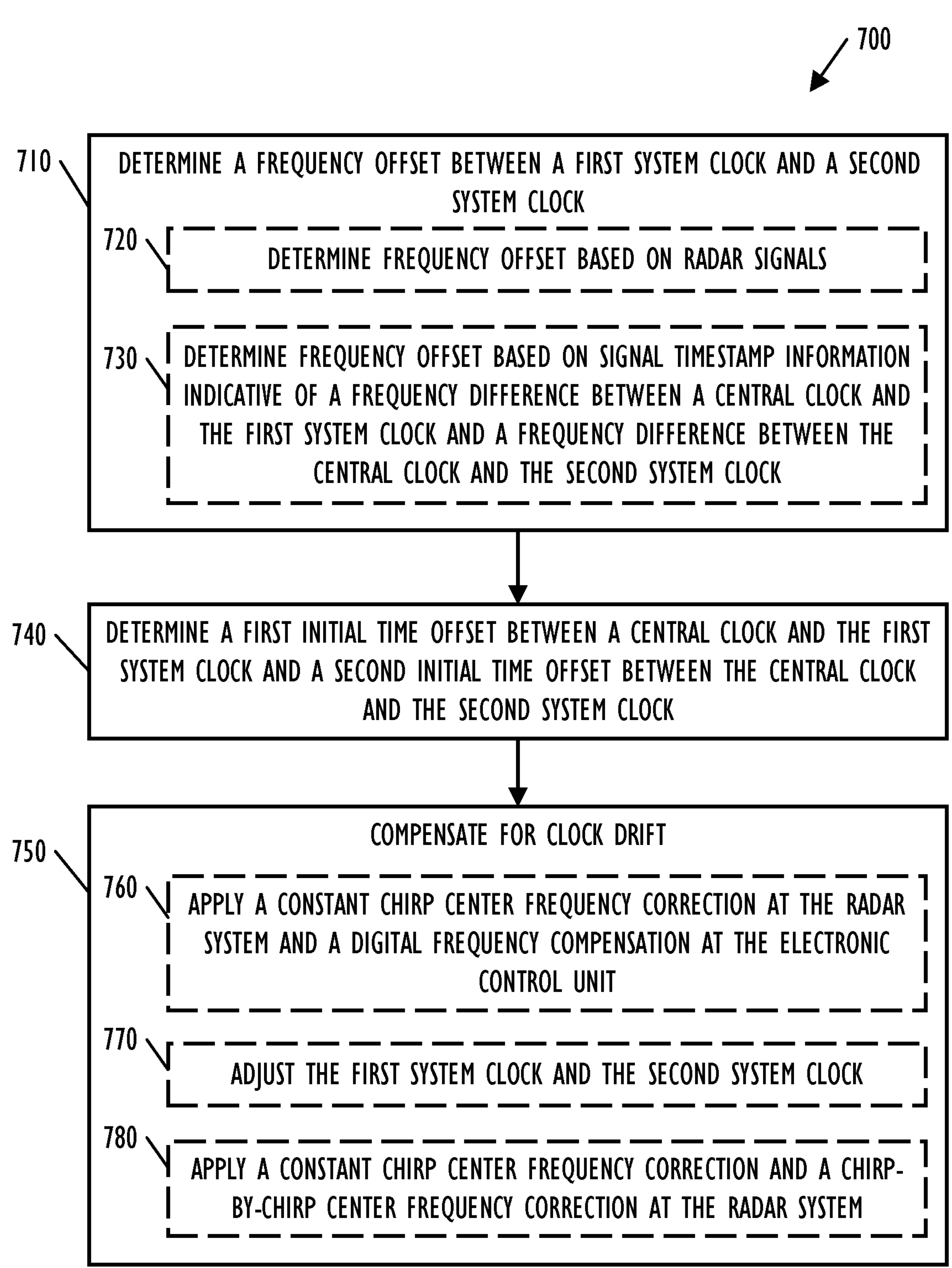
FIG. 7 shows, in flow chart form, an example process for compensating for clock differences between two radar systems, according to one embodiment.

FIG. 7 shows, in flow chart form, an example process 700 for compensating for clock differences between two radar systems, according to one embodiment. For ease of illustration, the process 700 is described herein with reference to the radar system 100 shown in FIG. 1 and the distributed radar system 200 shown in FIG. 2. The process 700 is described herein as being performed by the signal processor 170 in the MCPU 110 executing instructions stored in storage 180 of the radar system 100 and/or the electronic control unit 250, but can be performed by any appropriate processing unit executing instructions stored in any appropriate non-transitory computer-readable medium. The steps of process 700 are shown in a particular order in FIG. 7, but the steps of process 700 may be performed in a different order and/or some steps may be performed simultaneously. One or more steps of process 700 can be optional, and process 700 can include additional steps.

The process 700 begins at step 710, at which a frequency offset ($a_n-a_m$) between a first system clock for a first radar system and a second system clock for a second radar system. For example, the electronic control unit 250 or the signal processor 170 can determine the frequency offset between the system clock 210A of the radar system 100A and the system clock 210B of the radar system 100B. Step 710 can include one of optional steps 720 and 730, in some implementations. At optional step 720, the frequency offset ($a_n-a_m$) between the first system clock and the second system clock is determined directly based on the radar chirp signals, for example as described in described in U.S. patent application Ser. No. 18/090,798. At optional step 730, the frequency offset ($a_n-a_m$) between the first system clock and the second system clock is determined based on signal timestamp information from signals sent over the interface 230. The signal timestamp information is indicative of a frequency difference an between a central clock such as clock 260 and the first system clock 210A and a frequency difference $a_m$ between the central clock and the second system clock 210B.

At step 740, a first initial time offset $\tau_{initial;n}$ between a central clock and the first system clock and a second initial time offset $\tau_{initial;m}$ between the central clock and the second system clock are determined, for example as described in U.S. patent application Ser. No. 18/090,798. At step 750, the clock drift between the first and second system clocks is compensated. Step 750 can include one or more of optional steps 760, 770, and 780, in some implementations. At optional step 760, a constant chirp center frequency correction is applied at the radar system and a digital frequency compensation is applied at the electronic control unit 250. The constant chirp center frequency correction compensates for the difference ($a_n-a_m$) in center frequencies due to the different clock frequencies 210A and 210B for the radar systems 100A and 100B, and the digital frequency correction applied by the electronic control unit 250 compensates for the instantaneous time offset between the first and second system clocks due to clock drift. For example, the electronic control unit 250 can determine the relative drift $\tau_{offset;n,m}$ between two radar systems n and m based on each radar system's follower clock drift relative to the leader clock drift. The electronic control unit 250 can then determine the appropriate $f_{correction}$(n,m,q) for the radar systems n and m and the particular chirp index q. The electronic control unit 250 can apply the $f_{correction}$(n,m,q) to the radar signals provided to the electronic control unit 250 by the radar systems before performing range FFTs on the received radar signals.

At optional step 770, the oscillation frequency of each radar system's follower clock is manipulated to compensate for the clock drift, for example using a digitally controlled crystal oscillator. For example, the electronic control unit 250 or the MCPU 110 for the radar system 100A can adjust the system clock 210A to correct for the clock offset an between the central clock 260 and the system clock 210A, and the electronic control unit 250 or the MCPU 110 for the radar system 100B can adjust the system clock 210B to correct for the clock offset $\alpha_m$ between the central clock 260 and the system clock 210B. Manipulating the oscillation frequency of the follower clock may be limited by the finite precision of the follower clock and the time required to determine the instantaneous offset at different times in the chirp frame.

At optional step 780, a constant chirp center frequency correction is applied to radar signals to be transmitted by the first and second radar systems to compensate for the difference in center frequencies due to different clock frequencies in both radars, as well as a chirp-by-chirp center frequency correction to compensate for the instantaneous frequency offset between the central clock and the system clocks due to clock drift. For example, the electronic control unit 250 or the MCPU 110 for the radar system 100A can apply a constant chirp center frequency correction to radar chirp signals transmitted by the radar system 100A to compensate for the clock offset $\alpha_n$ between the central clock 260 and the system clock 210A. The electronic control unit 250 or the MCPU 110 for the radar system 100B can apply a constant chirp center frequency correction to radar chirp signals transmitted by the radar system 100B to compensate for the clock offset $\alpha_m$, between the central clock 260 and the system clock 210B.

As discussed previously herein, the relative time drift between radar systems decreases sensor sensitivity and reduces the maximum and minimum unambiguous distances able to be determined by the radar systems. The disclosed techniques and radar systems determine a frequency offset and an initial time offset between a radar system clock and a reference clock and use the determined frequency offset and time offset to compensate for clock drift between any two radar systems in a distributed radar system. The disclosed clock compensation technique allows the relative clock drift between any two radar systems to compensated for by applying a frequency compensation to received radar signals, separating contributions from different radar systems. In addition, the oscillation frequency of each radar system's clock can be manipulated to compensate for clock drift. After clock drift compensation, the sensor sensitivity and maximum and minimum unambiguous distances able to be determined by the distributed radar sensing system are improved.

Features specifically shown or described with respect to one embodiment set forth herein may be implemented in other embodiments set forth herein.

In this description, the term "couple" may cover connections, communications, or signal paths that enable a functional relationship consistent with this description, including intermediate or intervening components that do not alter the functional relationship. A device that is "configured to" perform a task or function may be configured by programming or hardwiring, for example, at a time of manufacturing by a manufacturer and/or may be configurable or reconfigurable by a user after manufacturing. The configuring may be done through firmware and/or software, construction and/or layout of hardware components and connections, or any combination thereof. As used herein, "node", "pin", and "lead" are used interchangeably. A circuit or device described herein as including certain components may be adapted to be coupled to those components instead, to form the described circuitry or device.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

A system includes a first radar transceiver, a second radar transceiver, at least one processor, and at least one non-transitory computer-readable medium storing machine instructions. The machine instructions cause the at least one processor to determine a first frequency offset $a_1$ and a first initial time offset $\tau_{initial}$; between a first clock signal for the first radar transceiver and a reference clock for the processor, and the processor determines a first clock drift for the first clock signal relative to the reference clock based on the first frequency offset $a_1$ and the first initial time offset $\tau_{initial;1}$. The processor determines a second frequency offset $a_2$ and a second initial time offset $\tau_{initial;2}$ between a second clock signal for the second radar transceiver and the reference clock, and a second clock drift for the second clock signal relative to the reference clock based on the second frequency offset $a_2$ and the second initial time offset $\tau_{initial;2}$. The processor then compensates for the first and second clock drift.

In some implementations, the machine instructions to determine the first frequency offset $a_1$ include machine instructions to determine the first frequency offset $a_1$ based on signal timestamp information between the first radar transceiver and the at least one processor. The machine instructions to determine the second frequency offset $a_2$ include machine instructions to determine the second frequency offset $a_2$ based on signal timestamp information between the second radar transceiver and the at least one processor. In some implementations, the machine instructions to compensate for the first and second clock drift include machine instructions to manipulate a first oscillation frequency of the first clock signal based on the first frequency offset $a_1$ and manipulate a second oscillation frequency of the second clock signal based on a second frequency offset $a_2$.

In some implementations, the machine instructions to compensate for the first and second clock drift include machine instructions to determine a relative clock drift between the first and second clock signals based on the first and second frequency offsets $a_1$ and $a_2$ and apply a frequency compensation to received radar signals from the first and second radar transceivers, wherein the frequency compensation is based on the relative frequency offset $a_1-a_2$. In some implementations, the relative clock drift between the first and second clock signals is represented as:

$$\tau_{offset} = \tau_{initial} + t((\alpha_1 - \alpha_2))$$

where $\tau_{offset}$ is the relative clock drift between the first and second clock signals, $\tau_{initial}$ is an initial clock offset between the first and second clock signals, and t is a current time. In some implementations, the frequency compensation for the received radar signals is represented as:

$$f_{correction}(q) = [\tau_{initial} + q * T_{chirp} * (a_1 - a_2)] * \frac{\Delta F}{T_{acq}}$$

where $f_{correction}(q)$ is the frequency compensation for a chirp index q, Tchirp is a period of a chirp signal, ΔF represents a bandwidth of the chirp signal, and Tacq is a period of the data acquisition time.

In some implementations, the machine instructions to compensate for the first and second clock drift include machine instructions to apply a first frequency compensation to radar signals to be transmitted by the first radar transceiver based on the first frequency offset $a_1$ and apply a second frequency compensation to radar signals to be transmitted by the second radar transceiver based on the second frequency offset $a_2$.

A non-transitory computer-readable medium stores machine instructions that, when executed by at least one processor, cause the at least one processor to determine a first frequency offset $a_1$ and a first initial time offset $\tau_{initial;1}$ between a first clock signal for a first radar transceiver and a reference clock for the at least one processor. The machine instructions cause the at least one processor to determine a first clock drift for the first clock signal relative to the reference clock based on the first frequency offset $a_1$ and the first initial time offset $\tau_{initial;1}$. The machine instructions cause the at least one processor to determine a second frequency offset $a_2$ and a second initial time offset $\tau_{initial;2}$ between a second clock signal for a second radar transceiver and the reference clock, and a second clock drift for the second clock signal relative to the reference clock based on the second frequency offset $a_2$ and the second initial time offset $\tau_{initial;2}$. The machine instructions cause the at least one processor to compensate for the first and second clock drift.

In some implementations, the machine instructions to determine the first frequency offset $a_1$ include machine instructions to determine the first frequency offset $a_1$ based on signal timestamp information between the first radar transceiver and the at least one processor. The machine instructions to determine the second frequency offset $a_2$ include machine instructions to determine the second frequency offset $a_2$ based on signal timestamp information between the second radar transceiver and the at least one processor. In some implementations, the machine instructions to compensate for the first and second clock drift include machine instructions to manipulate a first oscillation frequency of the first clock signal based on the first frequency offset $a_1$ and manipulate a second oscillation frequency of the second clock signal based on a second frequency offset $a_2$.

In some implementations, the machine instructions to compensate for the first and second clock drift include machine instructions to determine a relative clock drift between the first and second clock signals based on the first and second frequency offsets $a_1$ and $a_2$ and apply a frequency compensation to received radar signals from the first and second radar transceivers, wherein the frequency compensation is based on the relative frequency offset $a_1-a_2$. In some implementations, the relative clock drift between the first and second clock signals is represented as:

$$\tau_{offset} = \tau_{initial} + t((\alpha_1 - \alpha_2))$$

where $\tau_{offset}$ is the relative clock drift between the first and second clock signals, $\tau_{initial}$ is an initial clock offset between the first and second clock signals, and t is a current time. In some implementations, the frequency compensation for the received radar signals is represented as:

$$f_{correction}(q) = [\tau_{initial} + q * T_{chirp} * (a_1 - a_2)] * \frac{\Delta F}{T_{acq}}$$

where $f_{correction}(q)$ is the frequency compensation for a chirp index q, Tchirp is a period of a chirp signal, ΔF represents a bandwidth of the chirp signal, and Tacq is a period of the data acquisition time.

In some implementations, the machine instructions to compensate for the first and second clock drift include machine instructions to apply a first frequency compensation to radar signals to be transmitted by the first radar transceiver based on the first frequency offset $a_1$ and apply a second frequency compensation to radar signals to be transmitted by the second radar transceiver based on the second frequency offset $a_2$.

A method includes determining a first frequency offset $a_1$ and a first initial time offset $\tau_{initial;1}$ between a first clock signal for a first radar transceiver and a reference clock for a processor, and determining a first clock drift for the first clock signal relative to the reference clock based on the first frequency offset $a_1$ and the first initial time offset $\tau_{initial;1}$. A second frequency offset $a_2$ and a second initial time offset $\tau_{initial;2}$ between a second clock signal for a second radar transceiver and the reference clock are determined, and a second clock drift for the second clock signal relative to the reference clock based on the second frequency offset $a_2$ and the second initial time offset $\tau_{initial;2}$ is determined. The first and second clock drift are then compensated.

In some implementations, determining the first frequency offset $a_1$ includes determining the first frequency offset $a_1$ based on signal timestamp information between the first radar transceiver and the processor. Determining the second frequency offset $a_2$ includes determining the second frequency offset $a_2$ based on signal timestamp information between the second radar transceiver and the processor. In some implementations, compensating for the first and second clock drift includes manipulating a first oscillation frequency of the first clock signal based on the first frequency offset $a_1$ and manipulating a second oscillation frequency of the second clock signal based on a second frequency offset $a_2$.

In some implementations, compensating for the first and second clock drift includes determining a relative clock drift between the first and second clock signals based on the first and second frequency offsets $a_1$ and $a_2$ and applying a frequency compensation to received radar signals from the first and second radar transceivers. The frequency compensation is based on the relative frequency offset $a_1 - a_2$. In some implementations, the relative clock drift between the first and second clock signals is represented as:

$$\tau_{offset} = \tau_{initial} + t((\alpha_1 - \alpha_2))$$

where $\tau_{offset}$ is the relative clock drift between the first and second clock signals, $\tau_{initial}$ is an initial clock offset between the first and second clock signals, and t is a current time. In some implementations, the frequency compensation for the received radar signals is represented as:

$$f_{correction}(q) = [\tau_{initial} + q * T_{chirp} * (a_1 - a_2)] * \frac{\Delta F}{T_{acq}}$$

where $f_{correction}(q)$ is the frequency compensation for a chirp index q, Tchirp is a period of a chirp signal, ΔF represents a bandwidth of the chirp signal, and Tacq is a period of the data acquisition time.

In some implementations, compensating for the first and second clock drift includes applying a first frequency compensation to radar signals to be transmitted by the first radar transceiver based on the first frequency offset $a_1$ and applying a second frequency compensation to radar signals to be transmitted by the second radar transceiver based on the second frequency offset $a_2$.

What is claimed is:

1. A system comprising:

a first radar transceiver and a second radar transceiver;

at least one processor; and at least one non-transitory computer-readable medium storing machine instructions which, when executed by the at least one processor, cause the at least one processor to:

determine a first clock offset $\alpha_1$ and a first initial time offset $\tau_{initial;1}$ between a first clock signal for the first radar transceiver and a reference clock for the at least one processor;

determine a first clock drift for the first clock signal relative to the reference clock based on the first clock offset $\alpha_1$ and the first initial time offset $\tau_{initial;1}$;

determine a second clock offset $\alpha_2$ and a second initial time offset $\tau_{initial;2}$ between a second clock signal for the second radar transceiver and the reference clock;

determine a second clock drift for the second clock signal relative to the reference clock based on the second clock offset $\alpha_2$ and the second initial time offset $\tau_{initial;2}$; and compensate for the first and second clock drift by applying the first clock drift to transmitted or received radar signals of the first radar transceiver and the second clock drift to transmitted or received radar signals of the second radar transceiver.

2. The system of claim 1, wherein the machine instructions to determine the first clock offset $\alpha_1$ comprise machine instructions to determine the first clock offset $\alpha_1$ based on signal timestamp information between the first radar transceiver and the at least one processor, and wherein the machine instructions to determine the second clock offset $\alpha_2$ comprise machine instructions to determine the second clock offset $\alpha_2$ based on signal timestamp information between the second radar transceiver and the at least one processor.

3. The system of claim 1, wherein the machine instructions to compensate for the first and second clock drift comprise machine instructions to:

manipulate a first oscillation frequency of the first clock signal based on the first clock offset $\alpha_1$; and manipulate a second oscillation frequency of the second clock signal based on the second clock offset $\alpha_2$.

4. The system of claim 1, wherein the machine instructions to compensate for the first and second clock drift comprise machine instructions to:

determine a relative clock drift between the first and second clock signals based on a relative clock offset ($\alpha_1-\alpha_2$) corresponding to a difference between the first and second clock offsets $\alpha_1$ and $\alpha_2$; and apply a frequency compensation to received radar signals from the first and second radar transceivers, wherein the frequency compensation is based on the relative clock offset $\alpha_1-\alpha_2$.

5. The system of claim 4, wherein an instantaneous time offset between the first and second radar transceiver clock signals is represented as:

$$\tau_{offset} = \tau_{initial} + t((\alpha_1 - \alpha_2))$$

where $\tau_{offset}$ is the instantaneous time offset between the first and second radar transceiver clock signals, $\tau_{initial}$ is an initial time offset between the first and second clock signals, t is a current time, and $t((\alpha_1-\alpha_2))$ represents a product of the current time and the relative clock offset.

6. The system of claim 5, wherein the frequency compensation for the received radar signals is represented as:

$$f_{correction}(q) = [\tau_{initial} + q * T_{chirp} * (a_1 - a_2)] * \frac{\Delta F}{T_{acq}}$$

where $f_{correction}(q)$ is the frequency compensation for a chirp index q, Tchirp is a period of a chirp signal, ΔF represents a bandwidth of the chirp signal, and Tacq is a period of a data acquisition time.

7. The system of claim 1, wherein the machine instructions to compensate for the first and second clock drift comprise machine instructions to:

apply a first frequency compensation to radar signals to be transmitted by the first radar transceiver based on the first clock offset $\alpha_1$; and apply a second frequency compensation to radar signals to be transmitted by the second radar transceiver based on the second clock offset $\alpha_2$.

8. A non-transitory computer-readable medium storing machine instructions which, when executed by at least one processor, cause the at least one processor to:

determine a first clock offset $\alpha_1$ and a first initial time offset $\tau_{initial;1}$ between a first clock signal for a first radar transceiver and a reference clock for the at least one processor;

determine a first clock drift for the first clock signal relative to the reference clock based on the first clock offset $\alpha_1$ and the first initial time offset $\tau_{initial;1}$;

determine a second clock offset $\alpha_2$ and a second initial time offset $\tau_{initial;2}$ between a second clock signal for a second radar transceiver and the reference clock;

determine a second clock drift for the second clock signal relative to the reference clock based on the second clock offset $\alpha_2$ and the second initial time offset $\tau_{initial;2}$; and compensate for the first and second clock drift by applying the first clock drift to transmitted or received radar signals of the first radar transceiver and the second clock drift to transmitted or received radar signals of the second radar transceiver.

9. The non-transitory computer-readable medium of claim 8, wherein the machine instructions to determine the first clock offset $\alpha_1$ comprise machine instructions to determine the first clock offset $\alpha_1$ based on signal timestamp information between the first radar transceiver and the at least one processor, and wherein the machine instructions to determine the second clock offset $\alpha_2$ comprise machine instructions to determine the second clock offset $\alpha_2$ based on signal timestamp information between the second radar transceiver and the at least one processor.

10. The non-transitory computer-readable medium of claim 8, wherein the machine instructions to compensate for the first and second clock drift comprise machine instructions to:

manipulate a first oscillation frequency of the first clock signal based on the first clock offset $\alpha_1$; and manipulate a second oscillation frequency of the second clock signal based on the second clock offset $\alpha_1$.

11. The non-transitory computer-readable medium of claim 8, wherein the machine instructions to compensate for the first and second clock drift comprise machine instructions to:

determine a relative clock drift between the first and second clock signals based on a relative clock offset ($\alpha_1-\alpha_2$) corresponding to a difference between the first and second clock offsets $\alpha_1$ and $\alpha_2$; and apply a frequency compensation to received radar signals from the first and second radar transceivers, wherein the frequency compensation is based on the relative clock offset $\alpha_1-\alpha_2$.

12. The non-transitory computer-readable medium of claim 11, wherein an instantaneous time offset between the first and second radar transceiver clock signals is represented as:

$$\tau_{offset} = \tau_{initial} + t((\alpha_1 - \alpha_2))$$

where $\tau_{offset}$ is the instantaneous time offset between the first and second radar transceiver clock signals, $\tau_{initial}$ is an initial time offset between the first and second clock signals, t is a current time, and $t((\alpha_1-\alpha_2))$ represents a product of the current time and the relative clock offset.

13. The non-transitory computer-readable medium of claim 12, wherein the frequency compensation for the received radar signals is represented as:

$$f_{correction}(q) = [\tau_{initial} + q * T_{chirp} * (a_1 - a_2)] * \frac{\Delta F}{T_{acq}}$$

where $f_{correction}(q)$ is the frequency compensation for a chirp index q, Tchirp is a period of a chirp signal, ΔF represents a bandwidth of the chirp signal, and Tacq is a period of a data acquisition time.

14. The non-transitory computer-readable medium of claim 8, wherein the machine instructions to compensate for the first and second clock drift comprise machine instructions to:

apply a first frequency compensation to radar signals to be transmitted by the first radar transceiver based on the first clock offset $\alpha_1$; and apply a second frequency compensation to radar signals to be transmitted by the second radar transceiver based on the second clock offset $\alpha_2$.

15. A method comprising:

determining a first clock offset $\alpha_1$ and a first initial time offset $\tau_{initial;1}$ between a first clock signal for a first radar transceiver and a reference clock for at least one processor;

determining a first clock drift for the first clock signal relative to the reference clock based on the first clock offset $\alpha_1$ and the first initial time offset $\tau_{initial;1}$;

determining a second clock offset $\alpha_1$ and a second initial time offset $\tau_{initial;2}$ between a second clock signal for a second radar transceiver and the reference clock;

determining a second clock drift for the second clock signal relative to the reference clock based on the second clock offset $\alpha_1$ and the second initial time offset $\tau_{initial;2}$; and compensating for the first and second clock drift by applying the first clock drift to transmitted or received radar signals of the first radar transceiver and the second clock drift to transmitted or received radar signals of the second radar transceiver.

16. The method of claim 15, wherein determining the first frequency offset $a_1$ comprises determining the first clock offset $\alpha_1$ based on signal timestamp information between the first radar transceiver and the at least one processor, and wherein determining the second clock offset $\alpha_2$ comprises determining the second clock offset $\alpha_2$ based on signal timestamp information between the second radar transceiver and the at least one processor.

17. The method of claim 15, wherein compensating for the first and second clock drift comprises:

manipulating a first oscillation frequency of the first clock signal based on the first clock offset $\alpha_1$; and manipulating a second oscillation frequency of the second clock signal based on the second clock offset $\alpha_2$.

18. The method of claim 15, wherein compensating for the first and second clock drift comprises:

determining a relative clock drift between the first and second clock signals based on a relative clock offset $(\alpha_1-\alpha_2)$ corresponding to a difference between the first and second offsets $\alpha_1$ and $\alpha_2$; and applying a frequency compensation to received radar signals from the first and second radar transceivers, wherein the frequency compensation is based on the relative clock offset $\alpha_1-\alpha_2$.

19. The method of claim 18, wherein an instantaneous time offset between the first and second radar transceiver clock signals is represented as:

$$\tau_{offset} = \tau_{initial} + t((\alpha_1 - \alpha_2))$$

where $\tau_{offset}$ is the instantaneous time offset between the first and second radar transceiver clock signals, $\tau_{initial}$ is an initial time offset between the first and second clock signals, t is a current time, and $t((\alpha_1-\alpha_2))$ represents a product of the current time and the relative clock offset.

20. The method of claim 19, wherein the frequency compensation for the received radar signals is represented as:

$$f_{correction}(q) = [\tau_{initial} + q * T_{chirp} * (a_1 - a_2)] * \frac{\Delta F}{T_{acq}}$$

where $f_{correction}(q)$ is the frequency compensation for a chirp index q, Tchirp is a period of a chirp signal, ΔF represents a bandwidth of the chirp signal, and Tacq is a period of a data acquisition time.

21. The method of claim 15, wherein compensating for the first and second clock drift comprises:

applying a first frequency compensation to radar signals to be transmitted by the first radar transceiver based on the first clock offset $\alpha_1$; and applying a second frequency compensation to radar signals to be transmitted by the second radar transceiver based on the second clock offset $\alpha_1$.

* * * * *